US008046810B2

(12) United States Patent
Srivastava (10) Patent No.: US 8,046,810 B2
(45) Date of Patent: Oct. 25, 2011

(54) METHOD AND APPARATUS FOR DELIVERING SUBSCRIPTION SERVICE CONTENT TO ROAMING USERS (75) Inventor: Anurag Srivastava, New Providence, NJ (US)

(73) Assignee: Alcatel Lucent, Paris (FR)

( * ) Notice: Subject to any disclaimer, the term of this patent is extended or adjusted under 35 U.S.C. 154(b) by 682 days.

(21) Appl. No.: 11/399,726

(22) Filed: Apr. 7, 2006

(65) Prior Publication Data
US 2007/0237330 A1 Oct. 11, 2007

(51) Int. Cl.
H04N 7/173 (2011.01)
G06F 15/16 (2006.01)
(52) U.S. Cl. ............................. 725/93; 725/38
(58) Field of Classification Search .................. None
See application file for complete search history.

(56) References Cited

U.S. PATENT DOCUMENTS

| RE34,895 E | 4/1995 | Morotomi et al. | |
|---|---|---|---|
| 6,611,654 B1* | 8/2003 | Shteyn | 386/83 |
| 6,865,617 B2* | 3/2005 | Zeidner et al. | 710/3 |
| 2002/0133821 A1* | 9/2002 | Shteyn | 725/46 |
| 2003/0030751 A1 | 2/2003 | Lupulescu et al. | |
| 2004/0055021 A1* | 3/2004 | Marland | 725/146 |
| 2004/0116118 A1 | 6/2004 | Karaoguz et al. | |
| 2004/0117813 A1* | 6/2004 | Karaoguz et al. | 725/5 |
| 2004/0128693 A1 | 7/2004 | Weigand | |
| 2004/0172654 A1* | 9/2004 | Pei et al. | 725/96 |
| 2004/0199667 A1* | 10/2004 | Dobbins | 709/240 |
| 2004/0221305 A1* | 11/2004 | Broussard et al. | 725/38 |

(Continued)

FOREIGN PATENT DOCUMENTS

CA 2368628 7/2002

(Continued)

OTHER PUBLICATIONS

U.S. Appl. No. 11/399,872, filed Apr. 7, 2006, Acharya et al., "Delivery of Subscription Services to Roaming Users Through Head End Equipment."

(Continued)

Primary Examiner — Andrew Koenig
Assistant Examiner — Carmine Malangone
(74) Attorney, Agent, or Firm — Ryan, Mason & Lewis, LLP (57) ABSTRACT A subscriber or other user is provided with access to a subscription service of a signal distribution system at a roaming location remote from a home location of the user. The home and remote locations are serviced by respective first and second head ends of the system. The subscription service comprises a plurality of selectable channels available to the user at the home location. The second head end obtains content for at least one channel of the subscription service available to the user at the home location, and inserts the content into a program stream utilizable for delivery of content to an interface device at the remote location to thereby make the channel accessible to the user at the remote location. In one embodiment, responsive to a channel change command initiated by the user via an interface device at the remote location, the second head end first determines if content for the newly-selected channel is already available in the second head end as a result of subscription services provided to any other user serviced by the second head end. If the content for the newly-selected channel is already available in the second head end, the second head end immediately makes that content accessible to the user at the remote location without obtaining it from the first head end.

20 Claims, 2 Drawing Sheets

U.S. PATENT DOCUMENTS

| | | | |
|---|---|---|---|
| 2004/0233281 A1 | 11/2004 | Tolmei | |
| 2004/0235492 A1 | 11/2004 | Chang et al. | |
| 2004/0259522 A1 | 12/2004 | Alicherry et al. | |
| 2005/0136946 A1* | 6/2005 | Trossen et al. | 455/456.2 |
| 2005/0210138 A1 | 9/2005 | Zigmond et al. | |
| 2005/0289589 A1* | 12/2005 | Vermola | 725/35 |
| 2006/0005224 A1* | 1/2006 | Dunning et al. | 725/115 |
| 2006/0064583 A1* | 3/2006 | Birnbaum et al. | 713/164 |
| 2006/0174276 A1* | 8/2006 | Derrenberger et al. | 725/46 |
| 2006/0259927 A1 | 11/2006 | Acharya et al. | |
| 2006/0277576 A1 | 12/2006 | Acharya et al. | |
| 2007/0097955 A1* | 5/2007 | Li et al. | 370/352 |

FOREIGN PATENT DOCUMENTS

| | | |
|---|---|---|
| EP | 1041825 | 10/2000 |
| EP | 1585313 | 10/2005 |
| EP | 1626525 | 2/2006 |
| GB | 2 215 568 A | 9/1989 |
| JP | 63-298698 | 12/1988 |
| JP | 3-134799 | 6/1991 |
| JP | 2003-189288 | 7/2003 |
| WO | WO 01/15451 A1 | 3/2001 |
| WO | WO 2004/061696 A1 | 7/2004 |
| WO | PCTUS2007008117 | 11/2007 |

OTHER PUBLICATIONS

U.S. Appl. No. 11/145,832, filed Jun. 6, 2005, Acharya et al., "Signal Distribution System with User-Defined Channel Comprising Information from an External Network."

U.S. Appl. No. 11/130,329, filed May 16, 2005, Acharya et al., "Method and Apparatus for Providing Remote Access to Subscription Television Services."

* cited by examiner

METHOD AND APPARATUS FOR DELIVERING SUBSCRIPTION SERVICE CONTENT TO ROAMING USERS

RELATED APPLICATION(S)

The present application is related to U.S. patent application Ser. No. 11/130,329, filed May 16, 2005 and entitled "Method and Apparatus for Providing Remote Access to Subscription Television Services," and U.S. patent application Ser. No. 11/145,832, filed Jun. 6, 2005 and entitled "Signal Distribution System with User-Defined Channel Comprising Information from an External Network," both of which are commonly assigned herewith and incorporated by reference herein.

The present application is also related to U.S. patent application Ser. No. Ser. No. 11/399,872, entitled "Delivery of Subscription Services to Roaming Users Through Head End Equipment," which is filed concurrently herewith and incorporated by reference herein.

FIELD OF THE INVENTION

The present invention relates generally to signal distribution systems, and more particularly to techniques for distributing content associated with subscription services to roaming users in signal distribution systems.

BACKGROUND OF THE INVENTION

Conventional signal distribution systems include, by way of example, cable television systems, satellite television systems, and systems providing IPTV over digital subscriber line (DSL) or fiber. Such systems are configured to distribute media streams associated with subscription television services to system subscribers or other users. Subscription television services are usually tied to a particular household or other predetermined subscriber location. Typically, a given subscriber is provided with an interface device, such as a set-top box or receiver, for communicating with system head end equipment. The interface device is configured to permit the subscriber to receive, on a television or other presentation device coupled to the interface device at a home location, the particular subscription television services to which that subscriber is entitled by virtue of the subscription. A given subscription may encompass, by way of example, a number of basic broadcast channels, as well as one or more premium programming channels, such as movie channels, sports channels, specialty channels, pay-per-view channels, on-demand video channels, etc.

A serious drawback of conventional cable, satellite and IPTV systems is that there is typically no roaming capability provided for subscribers. That is, subscribers generally must be at their respective home locations in order to receive the television services to which they have subscribed. By way of example, if a first subscriber leaves his or her home location and visits a remote location that also serves as a home location for a second subscriber, there is no mechanism provided for allowing the first subscriber to access his or her subscription television services at the second subscriber location. Thus, if the first subscriber has paid for access to a premium programming channel at his or her home location, that subscriber has no ability to access the premium programming channel at the remote location. This is the case even if the remote location, that is, the home location of the second subscriber, has the same television service provider and type of interface device as the home location of the first subscriber.

The above-cited U.S. patent application Ser. No. 11/130,329 discloses techniques which address and solve the remote accessibility problem. In one embodiment disclosed therein, an arrangement is provided whereby subscribers can access their usual home location subscription television services when at remote locations, without the need for carrying media devices, communications devices or other equipment to the remote locations.

Further advances in remote accessibility are described in the above-cited U.S. patent application Ser. No. 11/145,832. As disclosed therein, users of a cable, satellite or IPTV system, or other type of signal distribution system, may be provided with access to user-defined content that is obtained by a service provider from one or more external networks. A user-defined channel, comprising content specified by a system user, is provided as one of a plurality of channels of a subscription service in a signal distribution system. The user-defined channel may comprise, for example, a tracking channel that identifies a current location of at least one entity, such as a particular family member, specified by the system user. As another example, the user-defined channel may comprise a video monitoring channel, with the video signals being sourced from video cameras at one or more monitored locations.

Despite the considerable advances provided by the techniques described in U.S. patent application Ser. Nos. 11/130,329 and 11/145,832, a need remains for additional improvements in providing user accessibility to subscription television services or other content via cable, satellite and IPTV systems, as well as other types of signal distribution systems.

SUMMARY OF THE INVENTION

The present invention in the illustrative embodiments provides improved techniques for delivering subscription television services or other content to roaming subscribers.

In accordance with one aspect of the invention, a subscriber or other user is provided with access to a subscription service of a signal distribution system at a roaming location remote from a home location of the user. The home and remote locations are serviced by respective first and second head ends of the system. The subscription service comprises a plurality of selectable channels available to the user at the home location. The second head end obtains content for at least one channel of the subscription service available to the user at the home location, and inserts the content into a program stream utilizable for delivery of content to an interface device at the remote location to thereby make the channel accessible to the user at the remote location.

In a first illustrative embodiment, the content for each of the plurality of channels is transported from the first head end to the second head end regardless of any particular channel selection made by the user via the interface device at the remote location and regardless of any availability of at least a portion of the content at the second head end as a result of subscription services provided to any other users serviced by the second head end. The plurality of channels may be associated in the first head end with a multicast group reserved for the user.

In a second illustrative embodiment, if content for any of the plurality of channels is already available in the second head end as a result of subscription services provided to any other user serviced by the second head end, that already available content is not transported from the first head end to the second head end. Instead, the already available content may be identified, for example, using a pointer to a multicast address where the content is available.

In a third illustrative embodiment, at a given point in time content for at most one a selected one of the plurality of channels is transported from the first head end to the second head end responsive to a particular channel selection made by the user via the interface device at the remote location. The selected channel may be associated in the first head end with a multicast group reserved for the user. Responsive to a channel change command initiated by the user via the interface device at the remote location, the first head end associates a different one of the channels with the multicast group reserved for the user.

In one or more of the foregoing embodiments, the second head end may determine, responsive to a channel change command initiated by the user via the interface device at the remote location, if content for the newly-selected channel is already available in the second head end as a result of subscription services provided to any other user serviced by the second head end. If the content for the newly-selected channel is already available in the second head end, the second head end makes that content immediately accessible to the user at the remote location, for example, by utilizing a multicast group of the other user. After making the content for the newly-selected channel available to the user at the remote location utilizing the multicast group of the other user, the second head end may later obtain the content for the newly-selected channel from the first head end, and make a corresponding adjustment to one or more multicast group assignments.

The illustrative embodiments advantageously reduce the bandwidth and multicast address space requirements associated with delivering content associated with subscription services to roaming subscribers.

DETAILED DESCRIPTION OF THE INVENTION

The invention will be illustrated herein in conjunction with illustrative embodiments of signal distribution systems and associated content delivery techniques. It should be understood, however, that the invention is not limited to use with the particular systems and techniques described, but is instead more generally applicable to any signal distribution application in which it is desirable to provide improved roaming capabilities to system users. For example, although described herein primarily in the context of subscription television services, the techniques of the invention can also be adapted in a straightforward manner to subscription audio services, such as those delivered via digital satellite radio systems. Systems of the latter type are considered a type of signal distribution system as that term is used herein.

Figure 1A:
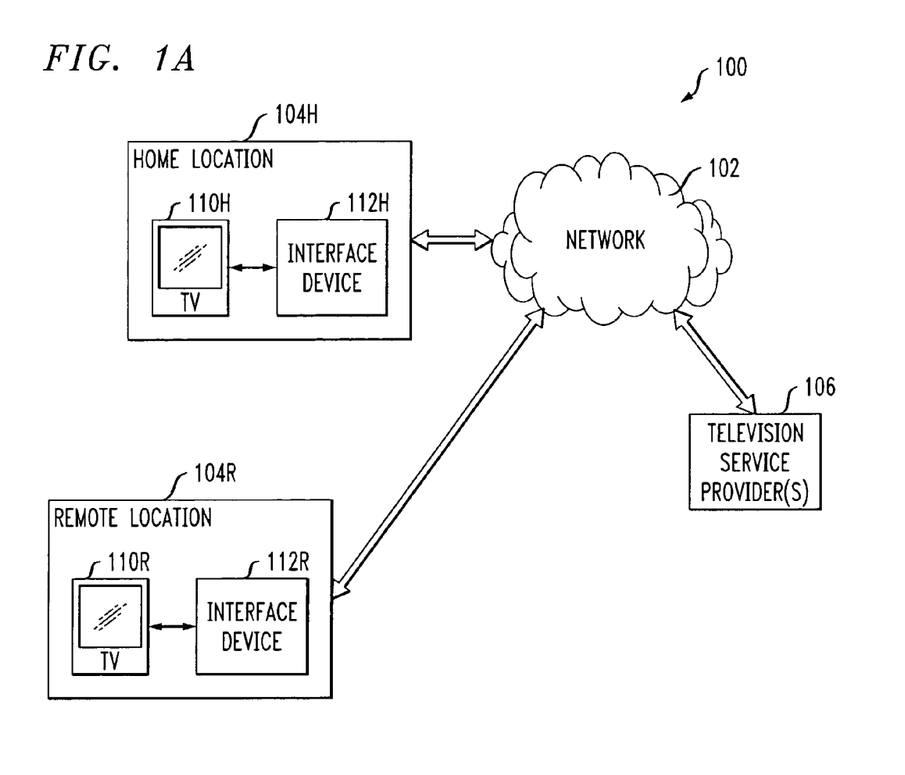
FIG. 1A shows an illustrative embodiment of a signal distribution system in accordance with the invention.

Referring now to FIG. 1A, a signal distribution system 100 comprises a network 102 over which equipment at a home location 104H and a remote location 104R communicates with one or more television service providers 106. The signal distribution system 100 may comprise, by way of example, a cable television system, a satellite television system, or portions or combinations of these and other systems. Element 106 may comprise otherwise conventional service provider equipment, including, for example, head end systems, satellites, servers, etc. The equipment at the home location 104H comprises a television 110H coupled to an interface device 112H. Similarly, the equipment at the remote location 104R comprises a television 110R coupled to an interface device 112R. The interface devices 112 may comprise, for example, set-top boxes, receivers, computers, or other processor-based devices, in any combination.

The network 102 may comprise any type of communication network suitable for transporting signals associated with the provision of subscriber television services, and the invention is not limited in this regard. For example, portions of the network 102 may comprise local networks, wide area networks, the Internet, etc.

The home location 104H is a designated home location of a particular system subscriber. Thus, it is a location at which the subscriber is permitted to access one or more television services by virtue of his or her subscription. It should be noted that the term "subscriber" as used herein is intended to encompass other subscribing entities, such as businesses or organizations, in addition to individuals or families. Subscribers may be viewed as examples of what are more generally referred to herein as users, and the term "user" is thus intended to include subscribers as well as other types of users. Also, the term "home" should be construed broadly, and is not intended to be restricted to individual or family residences. Instead, the home location of a particular subscriber may be any location at which that subscriber ordinarily accesses television services in accordance with the subscription. A home location may therefore be at a business facility, hotel or other building, in a means of conveyance such as an automobile, train, bus or airplane, or at any other suitable location.

A home location for a given subscriber may serve as a remote location for another subscriber or subscribers. The remote location 104R therefore may be a home location for another system subscriber. Accordingly, remote location 104R, like home location 104H, is also equipped with a television and an interface device as shown. In other embodiments, the remote location need not be a home location for any particular subscriber. For example, the remote location may be a room or other area in a hotel or means of conveyance that is intended to serve multiple subscribers over a given period of time.

It is to be appreciated that the invention does not require any particular geographic relationship between the home location 104H and the remote location 104R. Accordingly, the two locations may be within the same local area, served by a common service provider. As another example, the two locations may be more geographically remote from one another, such as in different regions of the same country, or even in different countries, with the two locations being serviced by different television service providers. It is also possible that the home and remote locations may be in a common building or other structure, for example, in respective first and second apartments of an apartment building. Numerous alternative arrangements are possible, as will be apparent to those skilled in the art.

Figure 1B:
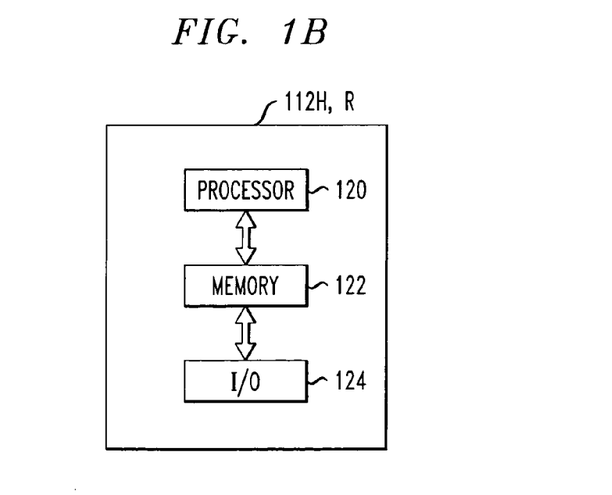
FIG. 1B shows a simplified block diagram of an interface device of the FIG. 1A system.

FIG. 1B illustrates that a given one of the interface devices 112H, 112R comprises a processor 120, a memory 122, and input/output (I/O) elements 124. The processor 120 may be, e.g., a microprocessor, a microcontroller, an application-specific integrated circuit (ASIC) or other type of processing device, as well as portions or combinations of such devices. The memory 122 may include an electronic random access memory (RAM), a read-only memory (ROM) or other type of storage device, as well as portions or combinations of such devices. The processor 120 and memory 122 are used in storage and execution of one or more software programs for implementing roaming television services techniques of a type to be described in greater detail below.

The particular signal distribution system configuration described above should be viewed as an illustrative example of a roaming television service arrangement in accordance with the invention, and it is to be understood that the invention can be implemented using other types and configurations of system components.

Additional details regarding the provision of roaming television services in a system such as that shown in FIG. 1A can be found in the above-cited U.S. patent application Ser. Nos. 11/130,329 and 11/145,832.

The present invention in an illustrative embodiment deals with delivery of roaming television services via an IPTV system. It is to be appreciated that the described techniques can be extended in a straightforward manner to be implemented using other types of systems, such as cable or satellite television systems.

Generally, a roaming television services technique in this embodiment allows a subscriber to access his or her subscription television services when away from his or her designated home location. The roaming television services may be provided to a roaming user equipped with any type of interface device. Although the remote location interface device 112R in the FIG. 1A example is illustratively a set-top box (STB), in other embodiments it may be a different type of interface device. Also, television 110R may be replaced with another type of presentation device, such as a computer, mobile telephone, personal digital assistant (PDA), wireless email device or any other type of device capable of presenting output associated with a roaming television service. It is also possible that the interface device and presentation device may be combined into a single device, as in an embodiment in which the interface device comprises a network interface of a computer, mobile telephone or other presentation device.

As noted previously, in other embodiments of the invention the roaming techniques may be applied to non-television services, such as subscription audio services delivered via digital satellite radio or other arrangements.

Figure 2:
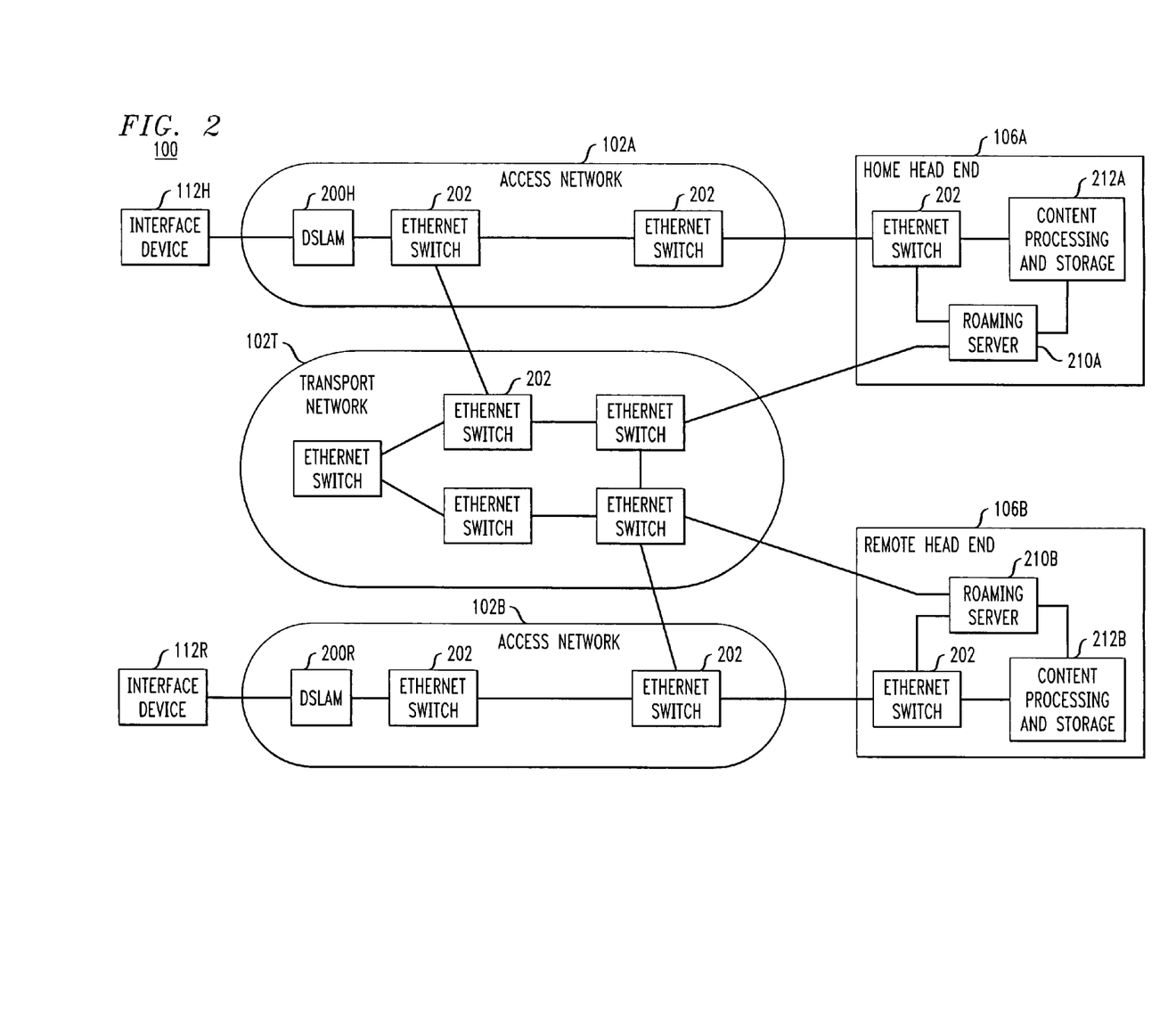
FIG. 2 is a more detailed view of one possible implementation of the FIG. 1A system for delivering roaming television services to a roaming user at a remote location.

FIG. 2 shows a more detailed view of one possible implementation of the system 100 for providing a roaming television services delivery technique via IPTV network head end equipment. The technique is implemented at least in part in the form of software that is executed by system elements such as one or more interface devices and equipment of one or more television service providers.

In the system 100 as shown in FIG. 2, home location and remote location interface devices 112H and 112R are coupled to respective digital subscriber line access multiplexers (DSLAMs) 200H and 200R in respective access networks 102A and 102B of network 102. The network 102 in this example further includes a transport network 102T. The access networks 102A and 102B and the transport network 102T each include multiple Ethernet switches 202, although other types of switches or routing elements may be used, in any combination. The particular interconnections among the switches 202 and their placement in particular networks or other elements of the system 100 is purely by way of illustrative example, and a wide variety of alternative arrangements may be used.

Also shown in the system are a home head end 106A and a remote head end 106B, both considered part of the television service provider(s) 106 of FIG. 1A. Each of these head ends comprises head end equipment including a roaming server 210 and a content processing and storage element 212. The head end equipment also includes an Ethernet switch 202 coupled to the corresponding access network. It is to be appreciated that the particular type of head end equipment as shown in FIG. 2 is merely an example, and may be altered in other embodiments. For example, the Ethernet switches in the head end equipment may be replaced with other types of switches or routing elements. Also, the roaming server may be combined with the content processing and storage element, or may be separated into other arrangements of elements providing similar functionality as described herein.

The servers 210A and 210B are referred to herein as "roaming" servers in that they are utilized in obtaining content for one or more roaming subscribers in system 100 and making that content available to the roaming subscribers. For example, as will be described in greater detail below, the roaming server 210B at the remote head end 106B may obtain content from the roaming server 210A at the home head end 106A in order to make such content available to a roaming user via remote location interface device 112R. The content processing and storage elements 212 may comprise otherwise conventional head end equipment for delivery of content to subscribers via the access networks 102A and 102B, such as controllers, signal combiners, databases or other storage devices, middleware, IPTV servers, local television acquisition servers, or other typical head end elements, in any combination.

A given subscriber may be viewed as having an associated home location channel lineup, representing the particular broadcast or premium programming channels, network personal video recorder (NPVR) channels, video-on-demand (VoD) channels, user-defined channels, or other types of channels that are available to the subscriber at his or her home location in accordance with a subscription service. The channel lineup associated with the given subscriber may thus include a very large number of channels. When such a subscriber roams to a remote location, the task of carrying all the associated content of his or her home location channel lineup may become prohibitive. The illustrative embodiments to be described below provide bandwidth-efficient techniques for carrying the roaming television services content for the given subscriber from head end equipment associated with the home location of the subscriber to head end equipment associated with the remote location in the system 100 of FIG. 2.

The system 100 in the illustrative embodiments is configured to create a unique program stream for a given roaming subscriber in order to carry a designated channel of the subscriber channel lineup from the home location head end equipment to the remote location head end equipment. The designated channel is typically selectable by the subscriber, and can be readily altered by, for example, the subscriber entering a channel change command via interface device 112R at the remote location. Thus, the unique program stream carries the channel currently desired by the subscriber from the home head end to the remote head end. This stream is then inserted into a remote location channel lineup at the remote location head end for delivery to the remote location interface device 112R.

A number of different techniques for delivering content from the home location head end 106A to the remote location head end 106B will now be described. The techniques are illustrated in the context of IPTV, but can be adapted in a straightforward manner for use in other types of signal distribution systems, such as cable and satellite television systems. Also, these particular techniques are presented by way of illustrative example only, and it is to be appreciated that other techniques can be used to implement the invention.

In the exemplary techniques to be described, it is assumed that a subscriber has a "roaming profile" comprising a number of channels of the subscription service that are designated as being available to that subscriber at remote locations. The roaming profile may comprise all of the channels that are part of the above-noted home location channel lineup of the subscriber, or just selected ones of those channels. For example, the subscriber may be permitted to designate certain ones of the channels of the home location lineup for remote location access, via commands that are provided to the system using the home location interface device 112H.

In the first technique, all of the channels that are part of the roaming profile of the given subscriber are carried from the home location head end 106A to the remote location head end 106B. For each subscriber, a dedicated group of multicast addresses is reserved for roaming purposes, and all of his or her roaming channels are put on the dedicated multicast group only accessible to him or her. All roaming channels are acquired by joining their multicast groups. Along with the channel content, the system may also obtain electronic program guide (EPG) information by interfacing with, for example, appropriately-configured middleware.

If one or more channels are present in an encrypted format, then decryption entitlement messages may be obtained from an appropriate digital rights management (DRM) entity, and sent to the remote location head end along with the roaming content. For those situations in which it is impractical or otherwise undesirable to transfer such entitlement messages from head end to head end, one possible alternative approach is to utilize a conditional access (CA) unit to decrypt each channel and access the unencrypted content.

Once the roaming channel content is acquired, all the channels are transported to the remote head end 106B using a unicast stream. Such a stream may be carried over the transport network 102T using well-known conventional techniques. At the remote head end, each unicast stream is copied again on a dedicated multicast stream reserved for the roaming subscriber. This newly created multicast group will carry the content of the roaming subscriber, and is routed and delivered to the remote location interface device 112R. In such an approach, the remote location head end 106B would also send a message to the DSLAM 200R serving the remote location in order to enable the access control for the roaming multicast groups. Information about mapping of roaming channels to the roaming multicast group is also pushed to the interface device 112R along with the acquired EPG information. This technique offers simplicity in terms of control and signaling. Also, since all the channels of the roaming profile are available in the remote location head end, channel change times are reduced. A disadvantage of this particular technique is that it will carry the same channel twice even if two roaming users are carrying the same channels to a remote location, and hence will require bandwidth proportional to the number of roaming subscribers. It also uses dedicated multicast groups, and hence would require a large multicast address space.

In the second technique, all of the channels that are part of the roaming profile of the given subscriber are again carried from the home location head end 106A to the remote location head end 106B, but the bandwidth and multicast address space requirements are reduced at the expense of more complex management and channel monitoring. When a roaming subscriber initiates a roaming session at a remote location, the system first obtains the roaming profile of the subscriber from the home location head end of that subscriber. Alternatively, all such roaming profiles may be maintained at each head end of the system. The remote location head end equipment compares the roaming profile of the subscriber with that of any other subscribers that are roaming in areas serviced by this head end. If there are no such other subscribers, then the content is obtained using the first technique described previously. In other words, all of the channels that are part of the roaming profile of the given subscriber are carried from the home location head end to the remote location head end, and made accessible to the subscriber via the remote location interface device. However, if there are other subscribers roaming in areas serviced by the remote location head end, then the system will determine if any of the channels in the roaming profile of the given subscriber are already present in the remote location head end equipment due to servicing of the other roaming subscribers. For the channels which are already present, content is not acquired again for this new roaming subscriber and instead, the system utilizes a pointer to a multicast address where the content is available in the remote location head end equipment. For the rest of the channels, content is acquired as in the first technique above.

In order to provide each roaming subscriber with guaranteed access to his or her roaming channels, the system maintains a data structure which includes a mapping of each channel and its associated multicast group to a count of the number of subscribers currently watching it. This is to ensure that when a roaming subscriber terminates roaming, all of his or her roaming channels are not stopped as there may be other roaming subscribers still active and watching the same channel. Using this technique, streaming of a given channel from the home location head end is only stopped when the associated count for the channels reaches zero, meaning that no other current roaming subscriber has the channel in his or her roaming profile.

In this second technique, no roaming subscriber has dedicated multicast address space, and instead a global pool is maintained from which a subscriber is allotted multicast addresses for particular channels and a single multicast address could be used by multiple roaming subscribers. Additionally, a DSLAM port may be opened for each roaming subscriber to access the allotted multicast groups. This technique has the advantage of offering the same benefits as the previous technique but can also provide significant reductions in bandwidth and multicast address space requirements to the extent there is overlap in the viewing habits of the roaming subscribers. In other words, the bandwidth and multicast address space requirements will be proportional to the union of the channels of the roaming subscribers, as opposed to the sum of the channels as in the first technique described above.

The third technique achieves further reductions in the bandwidth and multicast address space requirements associated with provision of roaming television services by transporting no more than a single channel of the roaming profile of a given subscriber from the home location head end 106A to the remote location head end 106B at any given time. This channel is selectable by the subscriber and is presented for viewing at the remote location. When the subscriber initiates the roaming, a unique multicast group is allotted to the subscriber. At the home location head end of the subscriber, one of the channels, such as the first one in the roaming profile or any other selected channel in the roaming profile, is acquired using the first technique described above. This channel is transported from the home location head end to the remote location head end as a unicast stream and copied to a new multicast group allotted to the subscriber. Program guide information is still obtained for all the channels present in the roaming profile of the user and delivered to the remote location interface device, although the content is only carried for one channel at any given time. A DSLAM port is also opened for this multicast group for the roaming subscriber.

The selected channel can be changed in the following manner. The roaming subscriber enters a channel change command via the interface device 112R at the remote location. The interface device communicates an identifier of the newly-selected channel to the roaming server 210B associated with the remote location head end 106B. This roaming server communicates with the roaming server 210A associated with the home location head end, which changes the source of the content to that of the currently-selected channel. However, no change is made at the remote location head end. The subscriber continues to remain on the same multicast group, even though he or she has selected a different channel. The channel change is implemented by changing the actual content carried from the home location head end which is copied on to this multicast group. This technique does not require any change on the multicast group used to deliver the content to the roaming subscriber at the remote location. Additionally, the system may maintain a data structure which identifies the channels currently being watched by the respective roaming subscribers at the remote location, so as to facilitate synchronization with their respective home location head ends.

It is readily apparent that this third technique considerably reduces the bandwidth and multicast address space requirements associated with provision of roaming television services. These requirements are proportional to the number of roaming subscribers, and not dependent on the actual number of channels in their respective roaming profiles. However, the time required to change channels may be longer than in the other techniques due to the latency involved in messaging between servers associated with the respective remote and local head ends.

The required channel change time may be reduced in certain circumstances in the following manner. In response to a channel change command entered by a given roaming subscriber via interface device 112R, the roaming server 210B associated with the remote location head end 106B checks to see if the content of the newly-selected channel is already being carried on behalf of any other roaming subscriber currently being serviced by that head end. If the content is already available at the remote location head end 106B, a pointer to the corresponding multicast group is returned, so as to make the content immediately available to the given roaming subscriber without having to transport it from the home location head end 106A. The given roaming subscriber watches this content, as made available on the multicast group of another roaming subscriber, while the channel change request is processed at the home location head end and the associated content is made available onto his or her own multicast group. After the content becomes available on the multicast group of the given roaming subscriber, a message can be sent to the remote location interface device of that subscriber directing a migration to that multicast group.

As noted above, the delivery techniques noted above can be applied to other types of signal delivery systems. By way of example, in the cable television context, the content may be obtained at the home location head end by selecting particular digital MPEG streams or by tuning to particular analog QAM channels, and then transported as a unicast stream to the remote location head end. At the remote location head end, the content may be delivered from the head end equipment to the interface device 112R in a particular assigned program stream within a given analog QAM channel. The assigned program stream may be one of a number of program streams normally used to deliver VoD content from a VoD server in the remote location head end to the interface device 112R, or NPVR content from an NPVR server in the remote location head end to the interface device 112R, although other types of program streams could also be used. Generally, the first, second and third techniques described above can be implemented in the cable context by utilizing assigned program streams instead of the multicast groups.

In embodiments in which the presentation device 110R is a portable device, such as a laptop computer, mobile telephone, PDA, wireless email device or other similar device, transcoding functionality may be implemented within the system to adjust the bit rate or other characteristics of the content so as to make it compatible with the capabilities of the presentation device.

Also, for any such IP endpoints that cannot be reached directly using multicast addressing, such as those on public networks, multicasting is used until the content reaches a location in the service provider network closest to the IP endpoints, and then unicasting is used to reach the IP endpoints.

The above-described embodiments of the invention are intended to be illustrative only. For example, although described in the context of particular signal distribution systems, the invention is not restricted to use in such systems. The described roaming television services techniques can be adapted in a straightforward manner to a wide variety of alternative systems, including cable and satellite television systems, using different arrangements of system elements. As indicated above, the techniques can be applied to a wide variety of subscription media services, including subscription audio services delivered via digital satellite radio, and to other arrangements for delivering signals associated with subscription media services.

Further, the media streams that are delivered to a remote location on behalf of a given subscriber may include any type of data, including, for example, digital audio, video, speech or other information signals, in any combination.

These and numerous other alternative embodiments within the scope of the following claims will be readily apparent to those skilled in the art.

I claim:

1. A method of providing access to a subscription service in a signal distribution system to a system user at a location remote from a home location of the user, the subscription service comprising a plurality of selectable channels available to the user at the home location, the home and remote locations being serviced by respective first and second head ends of the system, the method comprising the steps of:

obtaining in the second head end content for at least one channel of said subscription service available to the user at the home location; and inserting said content into a program stream utilizable for delivery of content to an interface device at the remote location to thereby make the channel accessible to the user at the remote location;

wherein content for each of the plurality of channels is transported from the first head end to the second head end regardless of any particular channel selection made by the user via the interface device at the remote location and regardless of any availability of at least a portion of the content at the second head end as a result of subscription services provided to any other users serviced by the second head end; and wherein the plurality of channels is associated in the first head end with a multicast group reserved only for the user, said multicast group comprising a plurality of multicast addresses reserved for providing the user with remote access to the plurality of selectable channels available to the user at the home location.

2. The method of claim 1 wherein the content is transported from the first head end to the second head end as a unicast stream.

3. The method of claim 1 wherein at least one of the first and second head ends monitors a total number of users accessing a particular one of the channels at respective remote locations serviced by the second head end.

4. The method of claim 3 wherein the content for the particular one of the channels is no longer transported from the first head end to the second head end when it is determined that the number of users accessing the particular one of the channels at respective remote locations serviced by the second head end is zero.

5. The method of claim 1 wherein the subscription service comprises a subscription television service.

6. The method of claim 1 wherein the signal distribution system comprises an IPTV system.

7. The method of claim 1 wherein the signal distribution system comprises a cable television system.

8. The method of claim 1 wherein the home location and the remote location are served by a common subscription television service provider.

9. A method of providing access to a subscription service in a signal distribution system to a system user at a location remote from a home location of the user, the subscription service comprising a plurality of selectable channels available to the user at the home location, the home and remote locations being serviced by respective first and second head ends of the system, the method comprising the steps of:
obtaining in the second head end content for at least one channel of said subscription service available to the user at the home location; and
inserting said content into a program stream utilizable for delivery of content to an interface device at the remote location to thereby make the channel accessible to the user at the remote location;
wherein the plurality of channels is associated in the first head end with a multicast group reserved only for the user, said multicast group comprising a plurality of multicast addresses reserved for providing the user with remote access to the plurality of selectable channels available to the user at the home location;
wherein if content for any of the plurality of channels is already available in the second head end as a result of subscription services provided to any other user serviced by the second head end, said already available content is not transported from the first head end to the second head end; and
wherein the already available content is identified using a pointer to a multicast address where the content is available.

10. The method of claim 9 wherein the content is transported from the first head end to the second head end as a unicast stream.

11. A method of providing access to a subscription service in a signal distribution system to a system user at a location remote from a home location of the user, the subscription service comprising a plurality of selectable channels available to the user at the home location, the home and remote locations being serviced by respective first and second head ends of the system, the method comprising the steps of:
obtaining in the second head end content for at least one channel of said subscription service available to the user at the home location; and
inserting said content into a program stream utilizable for delivery of content to an interface device at the remote location to thereby make the channel accessible to the user at the remote location;
wherein at a given point in time content for at most one a selected one of the plurality of channels is transported from the first head end to the second head end responsive to a particular channel selection made by the user via the interface device at the remote location;
wherein the selected channel is associated in the first head end with a multicast group reserved only for the user, said multicast group comprising a plurality of multicast addresses reserved for providing the user with remote access to the plurality of selectable channels available to the user at the home location; and
wherein responsive to a channel change command initiated by the user via the interface device at the remote location the first head end associates a different one of the channels with the multicast group reserved for the user.

12. The method of claim 11 wherein responsive to a channel change command initiated by the user via the interface device at the remote location the second head end determines if content for a newly-selected channel is already available in the second head end as a result of subscription services provided to any other user serviced by the second head end and if the content for the newly-selected channel is already available in the second head end the second head end makes said content accessible to the user at the remote location.

13. The method of claim 12 wherein the content for the newly-selected channel is made available to the user at the remote location utilizing a multicast group of the other user.

14. The method of claim 13 wherein after making the content for the newly-selected channel available to the user at the remote location utilizing the multicast group of the other user, the second head end obtains the content for the newly-selected channel from the first head end and makes a corresponding adjustment to one or more multicast group assignments.

15. The method of claim 11 wherein the content is transported from the first head end to the second head end as a unicast stream.

16. An interface device comprising a processor coupled to a memory and being configured for use in providing access to a subscription service in a signal distribution system to a system user at a location remote from a home location of the user, the subscription service comprising a plurality of selectable channels available to the user at the home location, the home and remote locations being serviced by respective first and second head ends of the system, the second head end being adapted to obtain content for at least one channel of said subscription service available to the user at the home location, and to insert said content into a program stream utilizable for delivery of content to the interface device to thereby make the channel accessible to the user at the remote location;
wherein at a given point in time content for at most one a selected one of the plurality of channels is transported from the first head end to the second head end responsive to a particular channel selection made by the user via the interface device at the remote location;
wherein the selected channel is associated in the first head end with a multicast group reserved only for the user, said multicast group comprising a plurality of multicast addresses reserved for providing the user with remote access to the plurality of selectable channels available to the user at the home location; and
wherein responsive to a channel change command initiated by the user via the interface device at the remote location the first head end associates a different one of the channels with the multicast group reserved for the user.

17. An apparatus for use in providing access to a subscription service in a signal distribution system to a system user at a location remote from a home location of the user, the subscription service comprising a plurality of selectable channels available to the user at the home location, the home and remote locations being serviced by respective first and second head ends of the system, the apparatus comprising:

head end equipment comprising at least one server, the head end equipment being adapted for communication with an interface device at the remote location;

the head end equipment being operative to obtain content for at least one channel of said subscription service available to the user at the home location, and to insert said content into a program stream utilizable for delivery of content to the interface device to thereby make the channel accessible to the user at the remote location;

wherein at a given point in time content for at most one a selected one of the plurality of channels is transported from the first head end to the second head end responsive to a particular channel selection made by the user via the interface device at the remote location;

wherein the selected channel is associated in the first head end with a multicast group reserved only for the user, said multicast group comprising a plurality of multicast addresses reserved for providing the user with remote access to the plurality of selectable channels available to the user at the home location; and wherein responsive to a channel change command initiated by the user via the interface device at the remote location the first head end associates a different one of the channels with the multicast group reserved for the user.

18. The apparatus of claim 17 wherein the content is transported from the first head end to the second head end as a unicast stream.

19. The apparatus of claim 17 wherein at least one of the first and second head ends monitors a total number of users accessing a particular one of the channels at respective remote locations serviced by the second head end.

20. The apparatus of claim 17 wherein responsive to another channel change command initiated by the user via the interface device at the remote location the second head end determines if content for a newly-selected channel is already available in the second head end as a result of subscription services provided to any other user serviced by the second head end and if the content for the newly-selected channel is already available in the second head end the second head end makes said content accessible to the user at the remote location.

\* \* \* \* \*